US011788964B1

(12) United States Patent
Burke et al.

(10) Patent No.: US 11,788,964 B1
(45) Date of Patent: Oct. 17, 2023

(54) ANALYSES OF SURFACE-MOUNT-TECHNOLOGY COMPONENTS USING FLUORESCENT-DYE PENETRANTS

(71) Applicant: Western Digital Technologies, Inc., San Jose, CA (US)

(72) Inventors: John Patrick Burke, San Jose, CA (US); Erwan Basiron, Perai (MY); Kamarol Azmin Kamaruddin, Penang (MY); Muhammad Nizam Bin Ilias, Penang (MY)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/741,422

(22) Filed: May 10, 2022

(51) Int. Cl.
    *G01N 21/64*      (2006.01)
(52) U.S. Cl.
    CPC ... *G01N 21/6456* (2013.01); *G01N 2021/646* (2013.01); *G01N 2021/6439* (2013.01)
(58) Field of Classification Search
    CPC ....... G01N 21/6456; G01N 2021/6439; G01N 2021/646
    See application file for complete search history.

(56) References Cited

U.S. PATENT DOCUMENTS

| | | | |
|---|---|---|---|
| 6,342,400 B1 * | 1/2002 | DePetrillo | H01L 22/24 257/E21.527 |
| 7,444,012 B2 | 10/2008 | White et al. | |
| 10,262,907 B1 | 4/2019 | Bartsch et al. | |
| 2005/0018898 A1 * | 1/2005 | White | G01N 21/91 382/145 |
| 2016/0093558 A1 * | 3/2016 | Cook | H01L 23/49838 257/676 |
| 2018/0277452 A1 * | 9/2018 | Singh | H01L 22/12 |

OTHER PUBLICATIONS

IPC. IPC-TM-650 Test Methods Manual No. 2.4.53. Aug. 2017 (11 pages).

* cited by examiner

*Primary Examiner* — David P Porta
*Assistant Examiner* — Mamadou Faye
(74) *Attorney, Agent, or Firm* — Michael Best & Friedrich LLP

(57) ABSTRACT

Methods and apparatus for testing solder joints of a PCB assembly using fluorescent-dye penetrants. The use of a suitable fluorescent-dye penetrant may significantly improve the sensitivity of a Dye and Pry test to dye indications compared to a typical sensitivity achievable thereby with a conventional dye penetrant. Some embodiments may use an automated fluorescence imaging system employing a translation stage to sequentially move individual solder-joint parts of a circuit under test into the field of view of a fluorescence microscope and a high-resolution digital camera to capture fluorescence images of the individual solder-joint parts. The movement of the translation stage and processing of the fluorescence images may be referenced to an electronic CAD file of the circuit to enable high-precision automated scanning of the solder-joint parts in the fluorescence imaging system, automated quantification of the extent of cracks in individual solder joints, and automatic generation of examination reports.

20 Claims, 5 Drawing Sheets

ANALYSES OF SURFACE-MOUNT-TECHNOLOGY COMPONENTS USING FLUORESCENT-DYE PENETRANTS

FIELD

This application relates generally to electrical circuits, and more particularly but not exclusively, to methods and apparatus for performing failure analyses of surface-mount-technology (SMT) components of printed-circuit-board (PCB) assemblies.

BACKGROUND

This section introduces aspects that may help facilitate a better understanding of the disclosure. Accordingly, the statements of this section are to be read in this light and are not to be understood as admissions about what is in the prior art or what is not in the prior art.

Integrated-circuit (IC) components may be attached and electrically connected to a PCB using a ball grid array (BGA). For example, contact pads with balls of solder may be arranged along a surface of an IC component. On the PCB, onto which the IC component is being fitted, there usually is a matching set of contact pads to provide electrical connectivity. The nascent assembly, including the PCB and IC component, may be heated, e.g., in a reflow oven, to melt the solder balls (also referred to as a reflow of the solder). Surface tension of the melted solder typically holds the IC component in alignment with the PCB, while the solder cools and solidifies to form permanent solder joints between the IC and PCB.

A BGA may beneficially provide a higher density of electrical connections than, e.g., a dual in-line package, because the whole under-surface of the IC component can be used for contact pads. However, one possible shortcoming of BGAs is that the resulting solder joints may be relatively more-susceptible to fracture, e.g., due to the mechanical stresses and strains caused during thermal cycling by a difference between the thermal-expansion coefficients of the IC component and PCB and/or by mechanical flexing and vibration of the PCB. To test for BGA failure, a Dye and Pry test may be used. In the pertinent literature, the Dye and Pry test may also be referred to as the Dye-n-Pry test, Dye and Pull test, Dye Staining test, or Dye Penetrant test.

SUMMARY

Various embodiments are directed to methods and apparatus for testing solder joints of a PCB assembly using fluorescent-dye penetrants. The use of a suitable fluorescent-dye penetrant may significantly improve the sensitivity of a Dye and Pry test to dye indications compared to a typical sensitivity achievable thereby with a conventional dye penetrant. Some embodiments may use an automated fluorescence imaging system employing (i) an XY translation stage to sequentially move individual solder-joint parts of a circuit under test into the field of view of a fluorescence microscope and (ii) a high-resolution digital camera to capture fluorescence images of the individual solder-joint parts. The movement of the translation stage and processing of the fluorescence images may be referenced to an electronic computer-aided-design (CAD) file of the circuit to enable high-precision automated scanning of the solder-joint parts in the fluorescence imaging system, automated quantification of the extent of cracks in individual solder joints, and automatic generation of examination reports.

According to an example embodiment, provided is a method of testing solder joints of an IC assembly, the IC assembly comprising an IC component with first contact pads, a substrate with second contact pads, and a plurality of solder joints, each of the solder joints being between a respective one of the first contact pads and a respective one of the second contact pads, the method comprising: soaking the IC assembly in a solution of a fluorescent dye; separating the IC component and the substrate to expose a plurality of first fracture surfaces at the IC component and a corresponding plurality of second fracture surfaces at the substrate, each matching pair of the first and second fracture surfaces corresponding to a respective one of the solder joints; and examining the first fracture surfaces or the second fracture surfaces to detect thereon indications of the fluorescent dye.

According to another example embodiment, provided is an automated method of inspecting fracture surfaces produced by physical separation of an IC component from a corresponding substrate, the IC component and the substrate having been connected to each other prior to the physical separation by a plurality of solder joints, the method comprising: cross-referencing a part under examination and a corresponding electronic computer-aided-design file, with the part secured on a translation stage of a fluorescence imaging system, the cross-referencing being performed by an electronic controller, the part being the IC component or the substrate; and acquiring fluorescence images of individual ones of the fracture surfaces by the electronic controller operating the translation stage to sequentially move the individual ones of the fracture surfaces into a field of view of a microscope objective of the fluorescence imaging system and by the electronic controller further operating a digital camera of the fluorescence imaging system to acquire fluorescence images of objects in the field of view.

According to yet another example embodiment, provided is a non-transitory machine-readable medium, having encoded thereon program code, wherein, when the program code is executed by a machine, the machine performs operations comprising an automated method of inspecting fracture surfaces produced by physical separation of an IC component from a corresponding substrate, the IC component and the substrate having been connected to each other prior to the physical separation by a plurality of solder joints, the method comprising: cross-referencing a part under examination and a corresponding electronic CAD file, with the part secured on a translation stage of a fluorescence imaging system, the cross-referencing being performed by an electronic controller, the part being the IC component or the substrate; and acquiring fluorescence images of individual ones of the fracture surfaces by the electronic controller operating the translation stage to sequentially move the individual ones of the fracture surfaces into a field of view of a microscope objective of the fluorescence imaging system and by the electronic controller further operating a digital camera of the fluorescence imaging system to acquire fluorescence images of objects in the field of view.

According to yet another example embodiment, provided is an apparatus for inspecting fracture surfaces produced by physical separation of an IC component from a corresponding substrate, the IC component and the substrate having been connected to each other prior to the physical separation by a plurality of solder joints, the apparatus comprising: means for cross-referencing a part under examination and a corresponding electronic computer-aided-design file, with the part secured on a translation stage of a fluorescence imaging system, the part being the IC component or the substrate; and means for acquiring fluorescence images of individual ones of the fracture surfaces by operating the translation stage to sequentially move the individual ones of the fracture surfaces into a field of view of a microscope objective of the fluorescence imaging system and by further operating a digital camera of the fluorescence imaging system to acquire fluorescence images of objects in the field of view.

According to yet another example embodiment, provided is an apparatus for inspecting fracture surfaces produced by physical separation of an IC component from a corresponding substrate, the IC component and the substrate having been connected to each other prior to the physical separation by a plurality of solder joints, the apparatus comprising: a fluorescence imaging system configured to acquire fluorescence images of objects in a field of view of a microscope objective thereof; a translation stage configured to sequentially move the individual ones of the fracture surfaces into the field of view of the microscope objective; an electronic controller configured to cross-reference a part under examination and a corresponding electronic computer-aided-design file, with the part secured on the translation stage, the part being the IC component or the substrate; and wherein the electronic controller is further configured to acquire fluorescence images of individual ones of the fracture surfaces by operating the translation stage and by further operating a digital camera of the fluorescence imaging system to capture fluorescence images of objects in the field of view.

DETAILED DESCRIPTION

Some embodiments may benefit from some features disclosed in the IPC-TM-650 Test Methods Manual, dated August 2017, which is incorporated herein by reference in its entirety.

Figure 1:
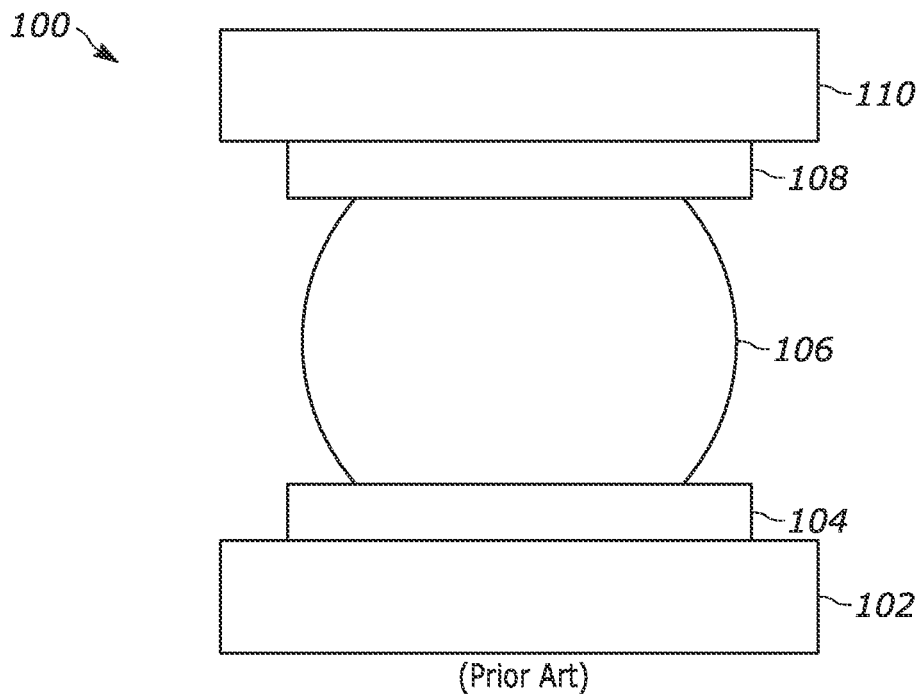
FIG. 1 is a drawing schematically illustrating a side view of an example solder-joint stack of a BGA.

FIG. 1 is a drawing schematically illustrating a side view of an example solder-joint stack 100 of a BGA. Stack 100 comprises a reflowed solder ball 106 that mechanically attaches and electrically connects a metal pad 104 of a PCB 102 and a corresponding metal pad 108 of an IC component 110. A representative BGA may typically have a relatively large number, e.g., between 10 and 200, of such solder joints.

The weakest parts and/or interfaces of different solder-joint stacks 100 of the corresponding BGA may typically fail during the "pull" portion of a Dye and Pry test, thereby exposing the corresponding fracture surfaces. In an individual stack 100, such failure may typically occur: (i) near the interface between PCB 102 and pad 104; (ii) near the interface between pad 104 and reflowed solder ball 106; (iii) through the body of reflowed solder ball 106; (iv) near the interface between pad 108 and reflowed solder ball 106; or (v) near the interface between IC component 110 and pad 108. Subsequent inspection of the resulting exposed fracture surfaces, both on the PCB side and the IC-component side, can provide insights into the condition of the whole BGA prior to the test-induced failure.

Figure 2:
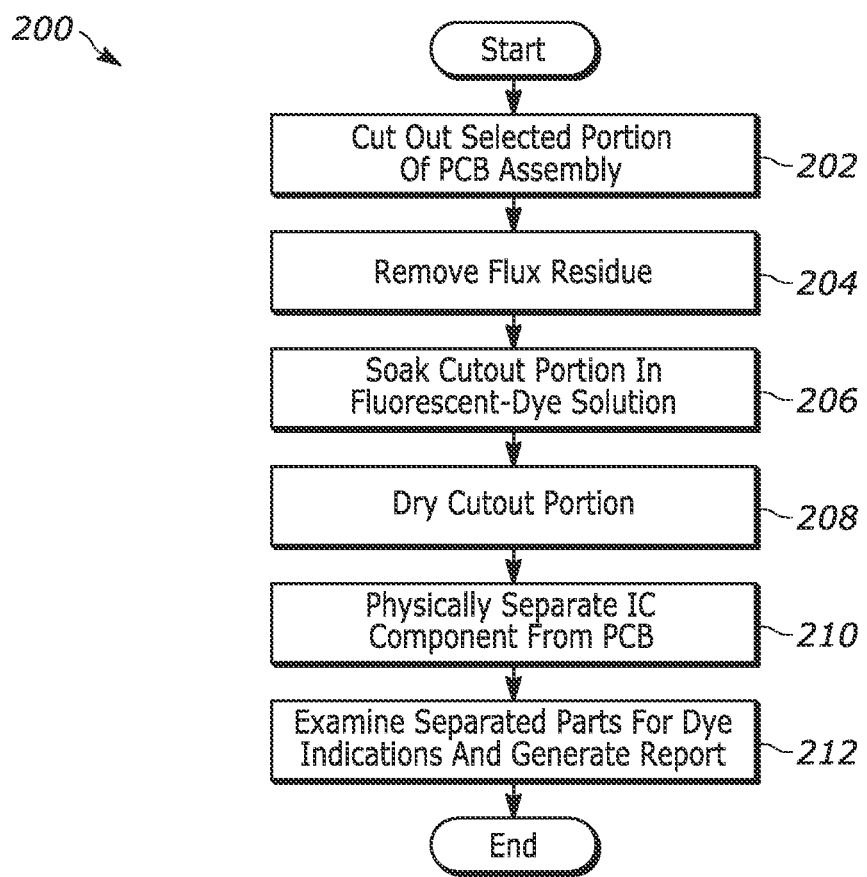
FIG. 2 is a flowchart illustrating a test method according to various embodiments.

FIG. 2 is a flowchart illustrating a Dye and Pry test method 200 according to various embodiments. Method 200 is described herein below in reference to FIGS. 1 and 3-6. An example embodiment of method 200 employs a fluorescent-dye penetrant and an automated imaging scanner configured to look for dye indications on the exposed fracture surfaces of the PCB side and IC-component side of the separated PCB assembly using a fluorometric microscope (see, e.g., FIGS. 3A, 3B, and 4). Example aspects, features, advantages, and/or benefits of various embodiments of method 200 will become more fully apparent, by way of example, from the following description and the corresponding drawings.

Method 200 comprises cutting out a selected portion of PCB 102, e.g., using a diamond sectioning saw (in block 202). The cut-out portion of PCB 102 may typically have the attached IC component 110 whose SMT solder joints are going to be examined. A visual inspection of the cutout portion, e.g., under a stereomicroscope, may also be performed (in block 202). If needed for the visual inspection, the cut-out portion may be cleaned with water and/or compressed air. In some cases, e.g., when PCB 102 is relatively small to fit the pull fixture used in block 210, the PCB assembly may be left intact. As such, the PCB-cutting operation may be optional in some cases. The visual-inspection operation may also be optional in some cases.

Method 200 further comprises cleaning any flux residue from around the SMT solder joints of the cut-out portion of the PCB assembly (in block 204). For example, the cut-out portion of the PCB assembly may be submerged in liquid flux remover for approximately one hour. The amount of time during which the cut-out portion of the PCB assembly remains submerged may depend on the circuit conditions, e.g., as judged based on the above-mentioned visual inspection. After being retrieved from the liquid flux remover, the cut-out portion of the PCB assembly may be thoroughly flushed using a spray-can flux remover. The goal is to substantially fully remove the flux residue because such removal of all flux residues and other particles and oils may typically enable the subsequently used dye to penetrate the cracks (if any) of individual solder-joint stacks 100. Low-pressure compressed air may be used to blow off excess flux solvent at the end of the cleaning (in block 204). In some embodiments, one or more or all operations in block 204 may be omitted.

Method 200 further comprises soaking the cut-out portion of the PCB assembly in a fluorescent-dye solution (in block 206). In various embodiments, the dissolved fluorescent dye may be selected, e.g., from the following nonexclusive set of dyes: (i) BRIGHT DYES water-based fluorescent tracing dye; (ii) EcoClean Solutions water-based fluorescent tracing dye; (iii) Bluewater Chemgroup water-based fluorescent tracing dye; and (iv) KINGSCOTE CHEMICALS water-based fluorescent tracing dye. In other embodiments, other suitable fluorescent dyes may also be used. The solution may typically be water-, alcohol-, or acetone-based.

For example, operations performed in block 206 may include placing the cut-out portion of the PCB assembly into a small tray or other suitable container and pouring the fluorescent-dye solution therein until the cut-out portion is completely immersed. When the dye solution is being reused, special care needs to be taken to ensure that the solution has appropriate viscosity. Appropriate viscosity helps the dye to penetrate into very thin cracks within the parts being dyed. When there are any concerns with the viscosity of the reused dye solution, the use of a fresh solution batch may be recommended (in block 206).

The tray containing the immersed cut-out portion may be placed into a vacuum chamber (in block 206), which can then be partially evacuated. In an example embodiment, the pressure inside the chamber may be kept at approximately 70 kPa (or 0.7 atm.) for about 30 minutes or 1 hour. The reduced pressure in the vacuum chamber typically helps the capillary forces to draw the dye solution into the cracks. The vacuum chamber may then be slowly vented back to the ambient pressure, and the cut-out portion of the PCB assembly may be removed from the tray to allow the excess solution to drain off (in block 206).

Method 200 further comprises drying the cut-out portion of the PCB assembly to allow the solvent to evaporate (in block 208). For example, low-pressure compressed or canned air may first be used to gently flush any solution from under the cut-out portion until no more dye solution drips down. The cut-out portion may then be transferred into an oven and dried therein, e.g., at an elevated temperature of between 80° C. and 150° C., for several hours. The cut-out portion may then be removed from the oven and allowed to further dry, e.g., overnight, under ambient conditions until all traces of the solvent evaporate (in block 208). It is important to recognize that any wet dye remaining in the cut-out portion of the PCB assembly can smear during the component separation (performed in block 210), which might lead to a false reading of the test results.

Method 200 further comprises physically separating IC component 110 from the corresponding attached portion of PCB 102 (in block 210). In an example embodiment, to perform the physical separation, first, a tee nut may be bonded to the outer surface of IC component 110 using a structural adhesive. After waiting for a sufficient length of time to allow the structural adhesive to cure, the tee nut and the PCB portion may be secured in opposite parts of a pull fixture operable to apply a substantially uniform tensile force between the parts. The tensile force may be gradually ramped up to cause the SMT solder joints of the stacks 100 to fail, thereby causing physical separation of the IC component 110 from the PCB. When needed, the separated parts may be gently dusted with canned air or dry, filtered and regulated compressed air to clear away the pull debris, such as flakes of dye, pieces of the solder masks, or other small fragments.

Figure 3B:
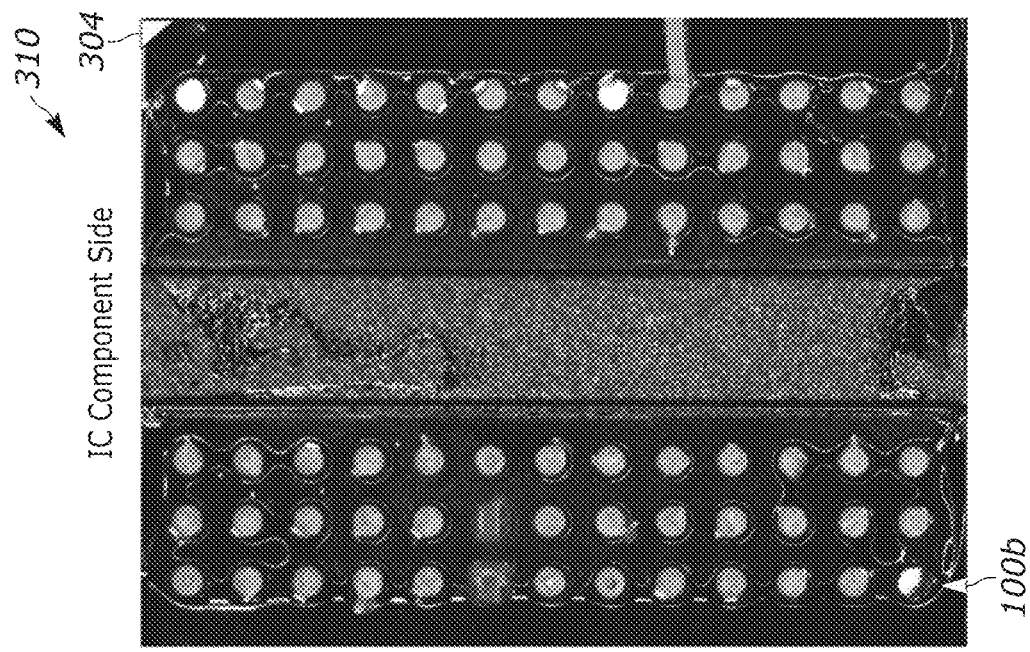
FIGS. 3A-3B pictorially illustrate example plan views of separated PCB and IC-component parts, respectively, that may result from certain operations of the test method of FIG. 2 according to an embodiment.
Figure 3A:
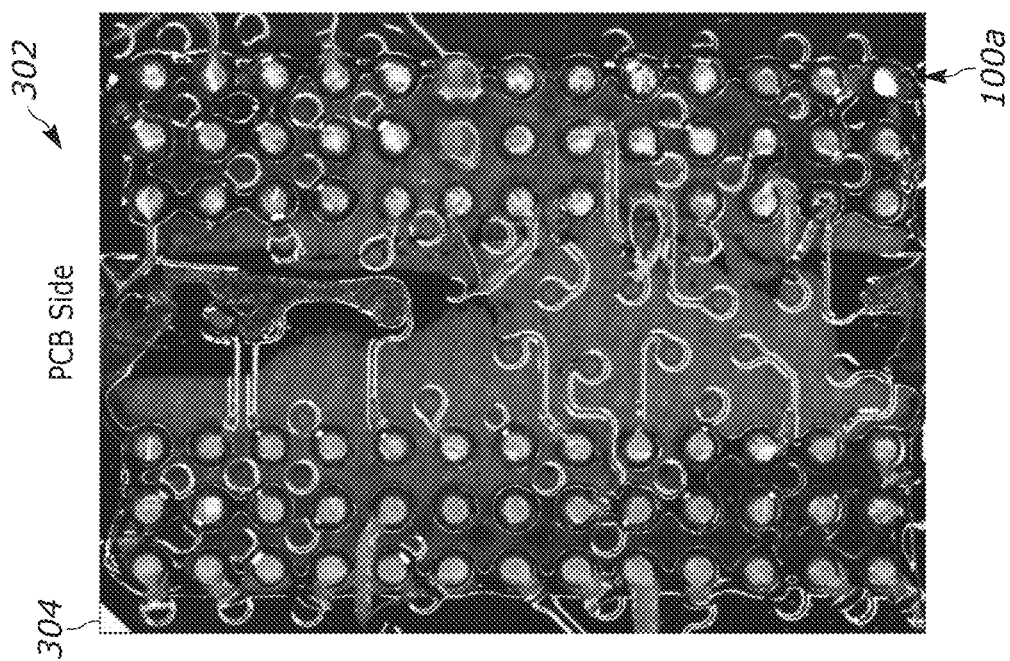

FIGS. 3A-3B pictorially illustrate example plan views of separated parts 302 and 310, respectively, that may result from the operations performed in block 210 according to an embodiment. More specifically, FIG. 3A pictorially illustrates a plan view of the PCB part 302. FIG. 3B similarly pictorially illustrates a plan view of the IC-component part 310. In this particular example, the corresponding portion of the PCB assembly had seventy-eight solder-joint stacks 100 arranged in two rectangular grids of 3×13 solder joints each. Corner markers 304 on the parts 302 and 310 indicate the relative alignment of these parts in the corresponding PCB assembly before the physical separation thereof in block 210 of method 200.

Referring back to FIG. 2, method 200 further comprises examining the separated parts (e.g., 302, 310) for fluorescent-dye indications (in block 212). Any solder-joint stack 100 that was cracked or damaged prior to the above-described physical separation of the parts would typically be stained with the dye, with both PCB and IC-component sides thereof being stained in a common (e.g., mirrored) pattern. For example, in FIGS. 3A and 3B, separated parts 100a and 100b of one of the solder-joint stacks 100 clearly exhibit such a common, mirrored stain pattern. In some examples, examining the separated parts for fluorescent-dye indications includes enhancing the fluorescence of the fluorescent dye with a fluorescence-excitation means.

In conventional Dye and Pry tests, which rely on non-fluorescent dyes, the examinations generally corresponding to the examinations performed in block 212 of method 200 may be challenging, e.g., for one or more of the following reasons. The semiconductor industry conventionally uses a red dye (such as the Steel Red Dykem dye) whose color may be difficult to resolve on copper-colored surfaces, which are often encountered in PCB assemblies. This difficulty may disadvantageously complicate accurate quantification of the test results, which are often required to be expressed as percentage values of the solder-joint surface areas showing cracking as manifested by dye indications. This difficulty may also disadvantageously complicate or prevent automation of at least some examination operations. However, such automation becomes very desirable for testing IC components having relatively large numbers (e.g., >50) of SMT solder joints.

These and possibly some other related problems in the state of the art can beneficially be addressed using at least some embodiments disclosed herein. For example, the use of fluorescent-dye penetrants in method 200 instead of conventional (non-fluorescent) dyes may significantly improve the sensitivity to dye indications during examinations performed in block 212 of method 200. The improved sensitivity may be leveraged to automate the examinations performed in block 212, e.g., as described in more detail below in reference to FIGS. 4-6.

Figure 4:
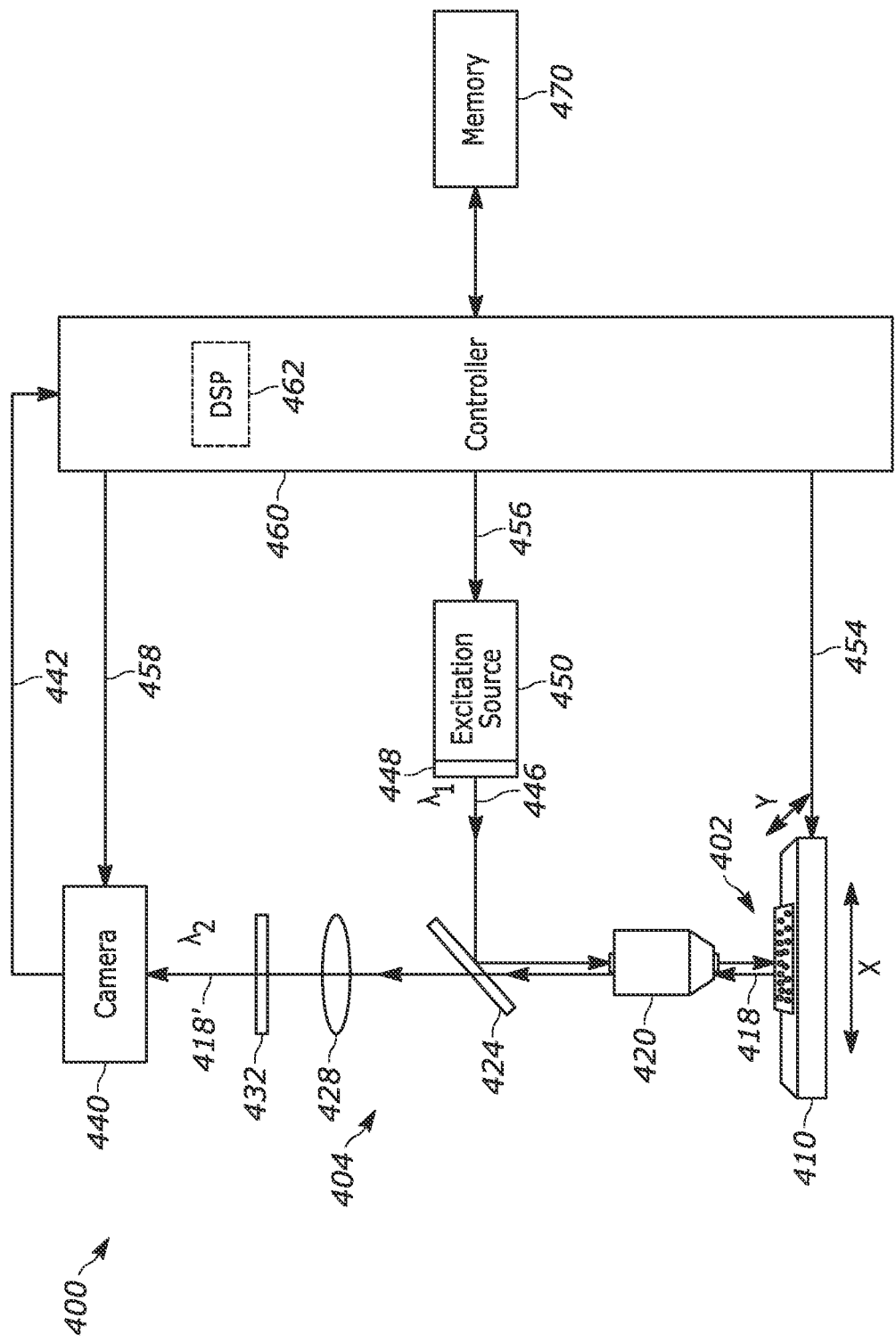
FIG. 4 is a block diagram illustrating a fluorescence imaging system that can be used in the test method of FIG. 2 according to various embodiments.

FIG. 4 is a block diagram illustrating a fluorescence imaging system 400 that can be used in test method 200 according to various embodiments. System 400 includes a fluorescence microscope 404 and an electronic controller 460 that enables automatic operation of the system. Microscope 404 is equipped with an XY-translation stage 410 that enables translation of the microscope's field of view along the upper surface of a part under examination (PUE) 402 mounted on the translation stage. PUE 402 can be, for example, the PCB part 302 (FIG. 3A) or the IC-component part 310 (FIG. 3B). An example method of operating system 400 is described below in reference to FIG. 5.

System 400 includes an excitation light source 450, e.g., a tunable laser, a light-emitting-diode (LED), a mercury arc lamp, or other suitable light source. In some embodiments, light source 450 may be operable in both CW and pulsed modes. Light source 450 may be equipped with an optional optical output filter 448. In various embodiments and configurations, a light beam 446 generated by light source 450 may have one or more of the following peak wavelengths ($X_i$): 365 nm, 375 nm, 405 nm, 436 nm, 470 nm, 532 nm, 546 nm, 565 nm, and 625 nm. In some embodiments, light source 450 may be configured to output other suitable wavelengths. Desired wavelength selectivity for each wavelength Xi may be achieved with optical filter 448, which may be tunable or reconfigurable in at least some embodiments.

Light beam 446 may be collimated using a suitable lens (not explicitly shown in FIG. 4) and directed to the reflective side of a dichroic filter 424 facing PUE 402 through a microscope objective 420. Light beam 446 may be focused to the backside of microscope objective 420, thereby producing substantially even illumination across the microscope's field of view in the focal plane of the microscope objective. A fluorescence light beam 418 emitted from PUE 402 in response to light beam 446 is transmitted through microscope objective 420 and dichroic filter 424 toward a digital camera 440. An achromatic lens 428 may be used to properly image the upper surface of PUE 402 on the pixelated light detector of camera 440. An optional optical input filter 432 may be used to block or stop any spurious components of light beam 418, e.g., to improve the signal-to-noise ratio (SNR) of the fluorescence images captured by camera 440. The spectral content (e.g., wavelength $\lambda_2$) of a light beam 418' received by camera 440 may typically depend on the dye used to stain PUE 402 (in block 206, FIG. 2), illumination wavelength(s) $\lambda_1$, and spectral characteristics of optical filters 424, 432.

Electronic controller 460 may typically include a digital signal processor (DSP) 462 that can be used to process the captured fluorescence images provided thereto, via an interface 442, by camera 440. DSP 462 may also be used to perform other processing operations for controller 460, as needed. Electronic controller 460 may use control signals 454, 456, 458 to control various aspects of system 400. For example, control signal 454 may be used to sequentially move into the field of view of microscope objective 420 different portions of PUE 402. Control signal 458 may then be used to trigger camera 440, thereby causing the camera to capture a fluorescence image of what is currently in the field of view of microscope objective 420. Control signal 456 may be used to appropriately configure light source 450 and optionally optical filter 448 to provide a suitable illumination light beam 446.

System 400 further includes a memory 470 coupled to electronic controller 460 as indicated in FIG. 4. In operation, memory 470 may provide, to controller 460, an electronic CAD file having detailed therein the BGA layout of PUE 402. Controller 460 may use the electronic CAD file to properly guide the XY-translation stage 410, by way of control signal 454, to position PUE 402 such that fluorescence images of different individual solder-joint parts can be sequentially captured by camera 440. Memory 470 may also be used for a variety of other purposes, including but not limited to storing the captured fluorescence images, storing image-processing software, and storing automatic examination reports generated by DSP 462 by applying image processing to the captured fluorescence images.

Figure 5:
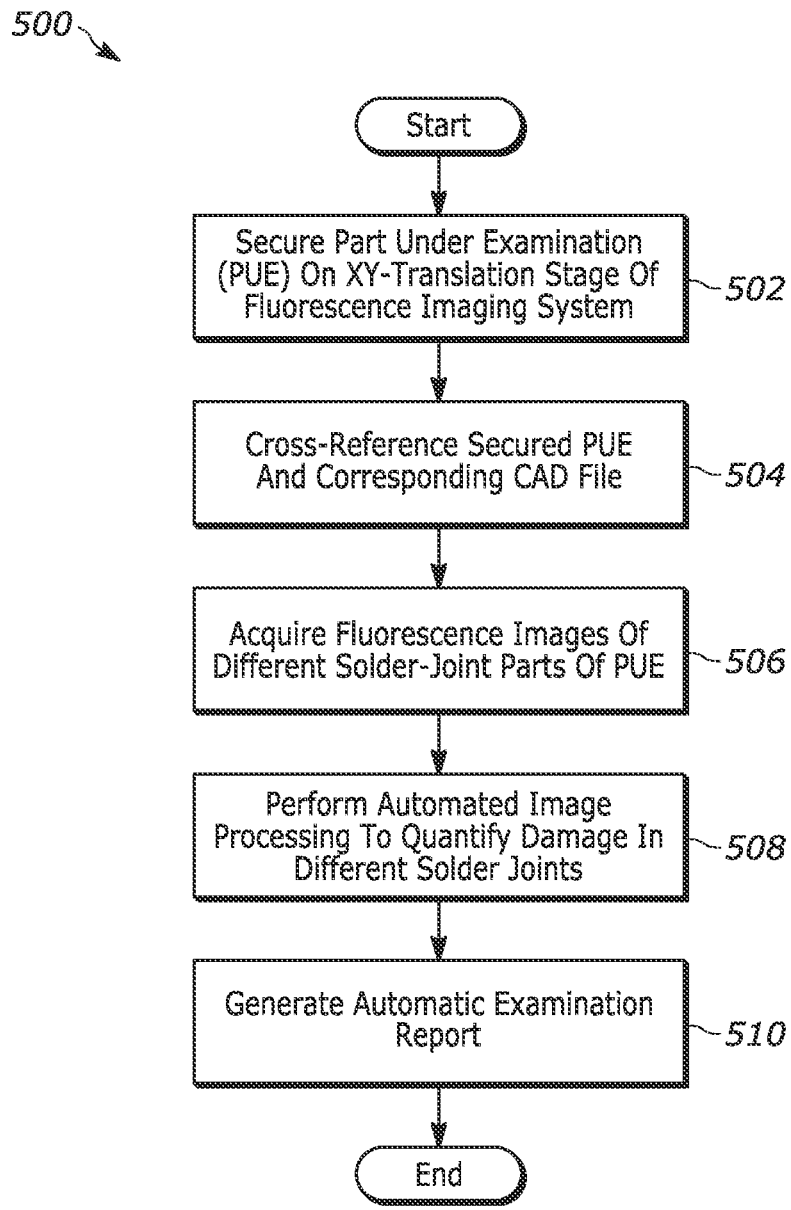
FIG. 5 is a flowchart illustrating a method of operating the fluorescence imaging system of FIG. 4 according to various embodiments.

FIG. 5 is a flowchart illustrating a method 500 of operating system 400 according to various embodiments. Method 500 can be used, e.g., in block 212 of method 200.

Method 500 comprises securing PUE 402 on XY-translation stage 410 (in block 502). As already indicated above, PUE 402 may typically be a separated part of a PCB assembly, such as the PCB part 302 (FIG. 3A) or the IC-component part 310 (FIG. 3B). PUE 402 may be secured on XY-translation stage 410, e.g., using clamps, holders, or other suitable fixtures.

Method 500 further comprises controller 460 retrieving, from memory 470, the electronic CAD file corresponding to the secured PUE 402 and cross-referencing the retrieved electronic CAD file and the PUE 402 mounted on the XY-translation stage 410 (in block 504). The electronic CAD file may typically have specified therein the model layout of contact pads 104 or 108 of PUE 402. The orientation of the model layout may typically be cross-referenced to and aligned with the orientation of the PUE 402 on the XY-translation stage 410 using one or more markers, such as the corner marker 304 (FIG. 3A or 3B). The cross-referencing may typically enable controller 460 to overlay the model layout on the images of PUE 402.

Method 500 further comprises controller 460 generating appropriate control signals 454, 456, 458 to sequentially capture images of individual solder-joint parts of PUE 402 (in block 506). For example, controller 460 may use the CAD file cross-referenced to the secured PUE 402 to appropriately configure the XY-translation stage 410 to sequentially move every solder-joint part of the PUE into the field of view of microscope objective 420 and further configure camera 440 to capture fluorescence images of the different solder-joint parts as they sequentially appear in the field of view. Controller 460 may also operate to save the fluorescence images received from camera 440 in memory 470 (in block 506).

Figure 6:
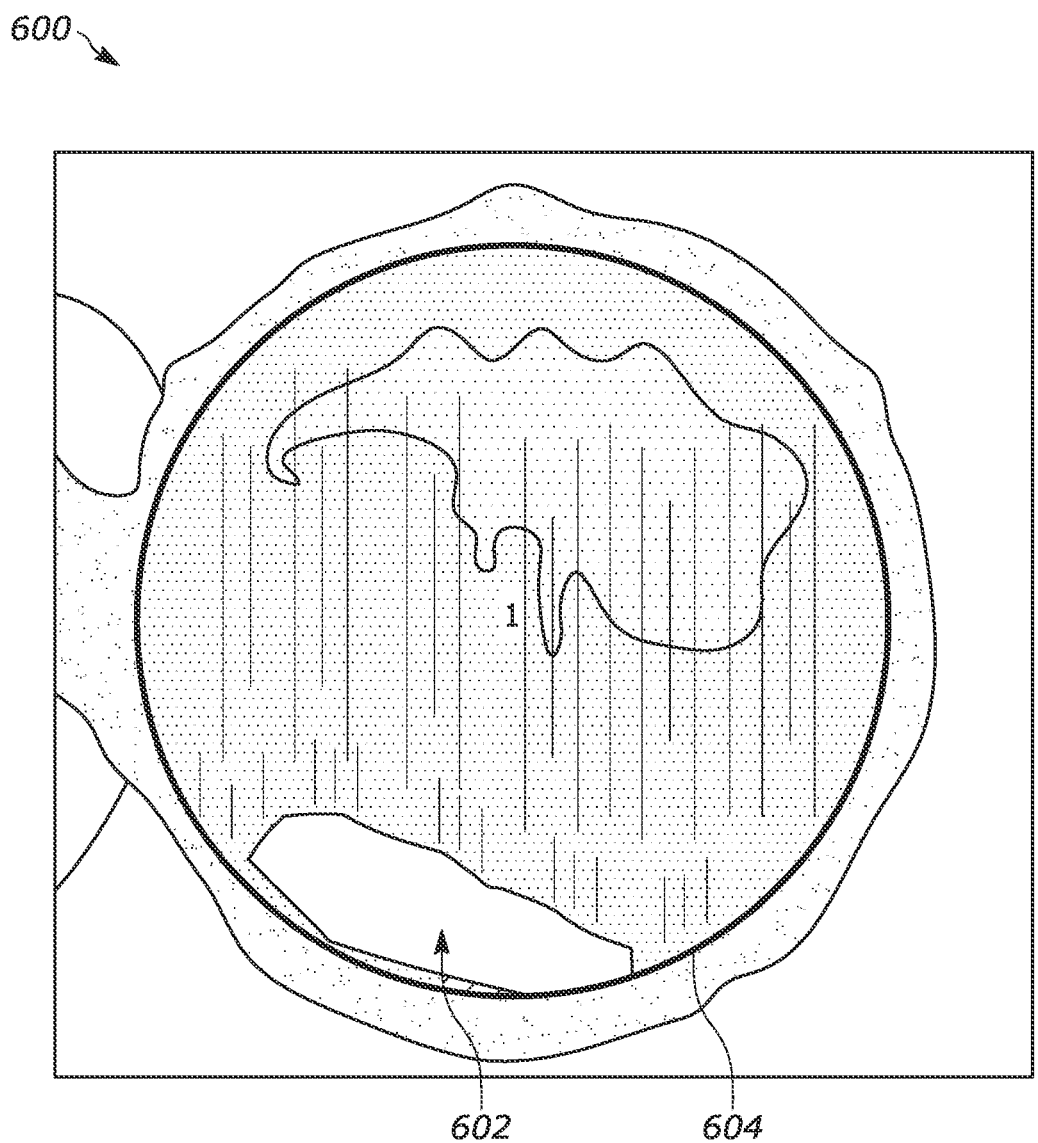
FIG. 6 is an example fluorescence image that may be acquired using the method of FIG. 5 according to an embodiment.

FIG. 6 is an example fluorescence image 600 that may be captured in block 506 of method 500 according to an embodiment. Image 600 is presented therein using a false-color image rendering for illustration purposes. In this particular example, a surface portion 602 of the corresponding solder-joint part has a clear and unambiguous dye indication. In the real-color rendering of image 600, surface portion 602 may typically have a much higher brightness than the remainder of the image. However, the dynamic-range settings of camera 440 and spectral content of illumination light beam 446 may be selected such as to cause the remainder of the image to still show sufficient details of the corresponding solder-joint part to enable proper quantification of the cracks, e.g., as indicated by the dye penetrant in surface portion 602, during the subsequent image processing in DSP 462.

Now referring to both FIGS. 5 and 6, method 500 further comprises DSP 462 running an image-processing program to quantify the extent of cracks (if any) in different solder joints revealed by the fluorescent-dye indications in the respective fluorescence images (in block 508). Some of such individual fluorescence images may generally be analogous to image 600 (FIG. 6). In some embodiments, upon finding a dye indication in a particular image, controller 460 may instruct the XY-translation stage 410 to move the corresponding solder-joint part of PUE 402 back into the field of view of microscope objective 420 and further instruct camera 440 to take a higher-resolution image of that solder-joint part (in block 508). For example, the new image may be a ¾-frame closeup at 20 megapixels or higher.

In an example embodiment, the image processing of an individual image (in block 508) may include computing the total cross-sectional area of the corresponding solder-joint part. In the example of FIG. 6, such computing includes fitting a circle 604 to the cross-sectional area and computing the area of the fitted circle. The image processing (in block 508) may further include computing the area of the surface portion 602 and computing the ratio of the areas of surface portion 602 and circle 604. The computed ratio may be expressed as a percentage value.

Method 500 further comprises controller 460 generating an examination report and saving the generated examination report in memory 470 (in block 510). In an example embodiment, the examination report may include: (i) the serial number of the PCB; (ii) locations on the PCB, in the CAD layout, of the IC component(s) having fluorescent-dye indications; (iii) for each such IC component, locations, in the CAD layout, of the solder joints having fluorescent-dye indications along with the corresponding crack-area values expressed as percentages; and and (iv) images of the impacted solder-joint parts.

According to an example embodiment disclosed above, e.g., in the summary section and/or in reference to any one or any combination of some or all of FIGS. 1-6, provided is an apparatus for inspecting fracture surfaces produced by physical separation of an integrated-circuit (IC) component (e.g., 110, FIG. 1) from a corresponding substrate (e.g., 102, FIG. 1), the IC component and the substrate having been connected to each other prior to the physical separation by a plurality of solder joints (e.g., 106, FIG. 1), the apparatus comprising: means for cross-referencing (e.g., 504, FIG. 5) a part under examination (e.g., 402, FIG. 4) and a corresponding electronic computer-aided-design file, with the part secured on a translation stage (e.g., 410, FIG. 4) of a fluorescence imaging system, the part being the IC component or the substrate; and means for acquiring (e.g., 506, FIG. 5) fluorescence images of individual ones of the fracture surfaces by operating the translation stage to sequentially move the individual ones of the fracture surfaces into a field of view of a microscope objective (e.g., 420, FIG. 4) of the fluorescence imaging system and by further operating a digital camera (e.g., 440, FIG. 4) of the fluorescence imaging system to acquire fluorescence images of objects in the field of view.

In some embodiments of the above apparatus, the apparatus further comprises means for performing (e.g., 508, FIG. 5) automated image processing to quantify an extent of cracks in different ones of the solder joints as revealed by fluorescent-dye indications in the fluorescence images.

In some embodiments of any of the above apparatus, the apparatus further comprises means for generating (e.g., 510, FIG. 5) an examination report based on the automated image processing.

According to another example embodiment disclosed above, e.g., in the summary section and/or in reference to any one or any combination of some or all of FIGS. 1-6, provided is a method of testing solder joints of an integrated-circuit (IC) assembly, the IC assembly comprising an IC component (e.g., 110, FIG. 1) with first contact pads (e.g., 108, FIG. 1), a substrate (e.g., 102, FIG. 1) with second contact pads (e.g., 104, FIG. 1), and a plurality of solder joints (e.g., 106, FIG. 1), each of the solder joints being between a respective one of the first contact pads and a respective one of the second contact pads, the method comprising the steps of: soaking (e.g., 206, FIG. 2) the IC assembly in a solution of a fluorescent dye; separating (e.g., 210, FIG. 2) the IC component and the substrate to expose a plurality of first fracture surfaces at the IC component (e.g., as in FIG. 3B) and a corresponding plurality of second fracture surfaces at the substrate (e.g., as in FIG. 3A), each matching pair of the first and second fracture surfaces corresponding to a respective one of the solder joints; and examining (e.g., 212, FIG. 2) the first fracture surfaces or the second fracture surfaces to detect thereon indications of the fluorescent dye.

In some embodiments of the above method, the soaking comprises holding the solution, with the IC assembly immersed therein, in a partially evacuated vacuum chamber.

In some embodiments of any of the above methods, the method further comprises the steps of: cutting out (e.g., 202, FIG. 2) a portion of a printed-circuit-board (PCB) assembly to obtain the IC assembly; removing (e.g., 204, FIG. 2) flux residue from around the solder joints; and drying (e.g., 208, FIG. 2) the IC assembly in an oven after the soaking.

In some embodiments of any of the above methods, the fracture surfaces include one or more of the following: a fracture surface resulting from a structural failure near an interface between the substrate and one of the second contact pads; a fracture surface resulting from a structural failure near an interface between one of the second contact pads and the respective one of the solder joints; a fracture surface resulting from a structural failure of a body of one of the solder joints; a fracture surface resulting from a structural failure near an interface between one of the first contact pads and the respective one of the solder joints; and a fracture surface resulting from a structural failure near an interface between the IC component and one of the first contact pads.

In some embodiments of any of the above methods, the examining comprises examining the first fracture surfaces or the second fracture surfaces with a fluorescence imaging system (e.g., 400, FIG. 4); wherein the IC assembly includes more than fifty solder joints; and wherein the fluorescence imaging system comprises an electronic controller (e.g., 460, FIG. 4) configured to run a program code causing the fluorescence imaging system to automatically examine the fracture surfaces corresponding to the more than fifty solder joints during the examining.

In some embodiments of any of the above methods, the examining further comprises: cross-referencing (e.g., 504, FIG. 5) the IC component and a corresponding electronic computer-aided-design file, with the IC component secured (e.g., 502, FIG. 5) on a translation stage (e.g., 410, FIG. 4) of the fluorescence imaging system, the cross-referencing being performed by an electronic controller (e.g., 460, FIG. 4); and acquiring fluorescence images of individual ones of the first fracture surfaces by the electronic controller operating the translation stage to sequentially move the individual ones of the first fracture surfaces into a field of view of a microscope objective (e.g., 420, FIG. 4) of the fluorescence imaging system and by the electronic controller further operating a digital camera (e.g., 440, FIG. 4) of the fluorescence imaging system to take pictures of objects in the field of view.

In some embodiments of any of the above methods, the examining comprises performing (e.g., 508, FIG. 5) automated image processing to quantify an extent of cracks in different ones of the solder joints as revealed by fluorescent-dye indications in respective fluorescence images of the fracture surfaces.

In some embodiments of any of the above methods, the examining further comprises automatically generating (e.g., 510, FIG. 5) an examination report based on the automated image processing.

In some embodiments of any of the above methods, the fluorescence imaging system comprises: a light source (e.g., 450, FIG. 4) configured to generate an illumination light beam (e.g., 446, FIG. 4) having a first wavelength; a digital camera (e.g., 440, FIG. 4) configured to capture fluorescence images; and optics (e.g., 420, 424, 428, FIG. 4) configured to direct the illumination light beam to a part under examination (e.g., 402, FIG. 4) and further configured to direct a fluorescence light beam (e.g., 418, FIG. 4) generated by the part in response to the illumination light beam to the digital camera, the fluorescence light beam having a second wavelength larger than the first wavelength (e.g., $\lambda_2 > \lambda_1$, FIG. 4).

In some embodiments of any of the above methods, the fluorescence imaging system further comprises a translation stage (e.g., 410, FIG. 4) configured to controllably move the part relative to the optics.

In some embodiments of any of the above methods, the optics comprises an optical filter (e.g., 424, 432, FIG. 4) configured to stop the first wavelength from reaching the digital camera.

In some embodiments of any of the above methods, the first wavelength is in the range between 350 nm and 450 nm; and wherein the second wavelength is in the range between 450 nm and 650 nm.

In some embodiments of any of the above methods, the fluorescence dye is selected from the set consisting of: (i) BRIGHT DYES water-based fluorescent tracing dye; (ii) EcoClean Solutions water-based fluorescent tracing dye; (iii) Bluewater Chemgroup water-based fluorescent tracing dye; and (iv) KINGSCOTE CHEMICALS water-based fluorescent tracing dye.

In some embodiments of any of the above methods, the method further comprises temperature cycling the IC assembly prior to the soaking.

According to yet another example embodiment disclosed above, e.g., in the summary section and/or in reference to any one or any combination of some or all of FIGS. 1-6, provided is an automated method (e.g., 500, FIG. 5) of inspecting fracture surfaces produced by physical separation of an integrated-circuit (IC) component (e.g., 110, FIG. 1) from a corresponding substrate (e.g., 102, FIG. 1), the IC component and the substrate having been connected to each other prior to the physical separation by a plurality of solder joints (e.g., 106, FIG. 1), the method comprising: cross-referencing (e.g., 504, FIG. 5) a part under examination (e.g., 402, FIG. 4) and a corresponding electronic computer-aided-design file, with the part secured on a translation stage (e.g., 410, FIG. 4) of a fluorescence imaging system, the cross-referencing being performed by an electronic controller (e.g., 460, FIG. 4), the part being the IC component or the substrate; and acquiring (e.g., 506, FIG. 5) fluorescence images of individual ones of the fracture surfaces by the electronic controller operating the translation stage to sequentially move the individual ones of the fracture surfaces into a field of view of a microscope objective (e.g., 420, FIG. 4) of the fluorescence imaging system and by the electronic controller further operating a digital camera (e.g., 440, FIG. 4) of the fluorescence imaging system to acquire fluorescence images of objects in the field of view.

In some embodiments of the above method, the method further comprises the electronic controller performing (e.g., 508, FIG. 5) automated image processing to quantify an extent of cracks in different ones of the solder joints as revealed by fluorescent-dye indications in the fluorescence images.

In some embodiments of any of the above methods, the method further comprises the electronic controller generating (e.g., 510, FIG. 5) an examination report based on the automated image processing.

In some embodiments of any of the above methods, the IC component and the substrate have been soaked in a solution of a fluorescent dye prior to the physical separation.

According to yet another example embodiment disclosed above, e.g., in the summary section and/or in reference to any one or any combination of some or all of FIGS. 1-6, provided is an apparatus for inspecting fracture surfaces produced by physical separation of an integrated-circuit (IC) component (e.g., 110, FIG. 1) from a corresponding substrate (e.g., 102, FIG. 1), the IC component and the substrate having been connected to each other prior to the physical separation by a plurality of solder joints (e.g., 106, FIG. 1), the apparatus comprising: a fluorescence imaging system configured to acquire fluorescence images of objects in a field of view of a microscope objective (e.g., 420, FIG. 4) thereof; a translation stage (e.g., 410, FIG. 4) configured to sequentially move the individual ones of the fracture surfaces into the field of view of the microscope objective; and an electronic controller (e.g., 460, FIG. 4) configured to cross-reference (e.g., 504, FIG. 5) a part under examination (e.g., 402, FIG. 4) and a corresponding electronic computer-aided-design file, with the part secured on the translation stage, the part being the IC component or the substrate; and wherein the electronic controller is further configured to acquire (e.g., 506, FIG. 5) fluorescence images of individual ones of the fracture surfaces by operating the translation stage and by further operating a digital camera (e.g., 440, FIG. 4) of the fluorescence imaging system to capture fluorescence images of objects in the field of view.

According to yet another example embodiment disclosed above, e.g., in the summary section and/or in reference to any one or any combination of some or all of FIGS. 1-6, provided is a non-transitory machine-readable medium, having encoded thereon program code, wherein, when the program code is executed by a machine, the machine performs operations comprising an automated method (e.g., 500, FIG. 5) of inspecting fracture surfaces produced by physical separation of an integrated-circuit (IC) component (e.g., 110, FIG. 1) from a corresponding substrate (e.g., 102, FIG. 1), the IC component and the substrate having been connected to each other prior to the physical separation by a plurality of solder joints (e.g., 106, FIG. 1), the method comprising: cross-referencing (e.g., 504, FIG. 5) a part under examination (e.g., 402, FIG. 4) and a corresponding electronic computer-aided-design (CAD) file, with the part secured on a translation stage (e.g., 410, FIG. 4) of a fluorescence imaging system, the cross-referencing being performed by an electronic controller (e.g., 460, FIG. 4), the part being the IC component or the substrate; and acquiring (e.g., 506, FIG. 5) fluorescence images of individual ones of the fracture surfaces by the electronic controller operating the translation stage to sequentially move the individual ones of the fracture surfaces into a field of view of a microscope objective (e.g., 420, FIG. 4) of the fluorescence imaging system and by the electronic controller further operating a digital camera (e.g., 440, FIG. 4) of the fluorescence imaging system to acquire fluorescence images of objects in the field of view.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A method of testing solder joints of an integrated-circuit (IC) assembly, the IC assembly comprising an IC component with first contact pads, a substrate with second contact pads, and a plurality of solder joints, each of the solder joints being between a respective one of the first contact pads and a respective one of the second contact pads, the method comprising:

soaking the IC assembly in a solution of a fluorescent dye;

separating the IC component and the substrate to expose a plurality of first fracture surfaces at the IC component and a corresponding plurality of second fracture surfaces at the substrate, each matching pair of the first and second fracture surfaces corresponding to a respective one of the solder joints; and examining the first fracture surfaces or the second fracture surfaces to detect thereon indications of the fluorescent dye.

2. The method of claim 1, wherein the soaking comprises holding the solution, with the IC assembly immersed therein, in a partially evacuated vacuum chamber.

3. The method of claim 1, further comprising:
cutting out a portion of a printed-circuit-board (PCB) assembly to obtain the IC assembly;
removing flux residue from around the solder joints; and
drying the IC assembly in an oven after the soaking.

4. The method of claim 1, wherein the fracture surfaces include one or more of the following:
a fracture surface resulting from a structural failure near an interface between the substrate and one of the second contact pads;
a fracture surface resulting from a structural failure near an interface between one of the second contact pads and the respective one of the solder joints;
a fracture surface resulting from a structural failure of a body of one of the solder joints;
a fracture surface resulting from a structural failure near an interface between one of the first contact pads and the respective one of the solder joints; and
a fracture surface resulting from a structural failure near an interface between the IC component and one of the first contact pads.

5. The method of claim 1,
wherein the examining comprises examining the first fracture surfaces or the second fracture surfaces with a fluorescence imaging system;
wherein the IC assembly includes more than fifty solder joints; and
wherein the fluorescence imaging system comprises an electronic controller configured to run a program code causing the fluorescence imaging system to automatically examine the fracture surfaces corresponding to the more than fifty solder joints during the examining.

6. The method of claim 5, wherein the examining further comprises:
cross-referencing the IC component and a corresponding electronic computer-aided-design file, with the IC component secured on a translation stage of the fluorescence imaging system, the cross-referencing being performed by an electronic controller; and
acquiring fluorescence images of individual ones of the first fracture surfaces by the electronic controller operating the translation stage to sequentially move the individual ones of the first fracture surfaces into a field of view of a microscope objective of the fluorescence imaging system and by the electronic controller further operating a digital camera of the fluorescence imaging system to take pictures of objects in the field of view.

7. The method of claim 5, wherein the examining comprises:
cross-referencing the substrate and a corresponding electronic computer-aided-design file, with the substrate secured on a translation stage of the fluorescence imaging system, the cross-referencing being performed by an electronic controller; and
acquiring fluorescence images of individual ones of the second fracture surfaces by the electronic controller operating the translation stage to sequentially move the individual ones of the second fracture surfaces into a field of view of a microscope objective of the fluorescence imaging system and by the electronic controller further operating a digital camera of the fluorescence imaging system to take pictures of objects in the field of view.

8. The method of claim 1, wherein the examining comprises performing automated image processing to quantify an extent of cracks in different ones of the solder joints as revealed by fluorescent-dye indications in respective fluorescence images of the fracture surfaces.

9. The method of claim 8, wherein the examining further comprises automatically generating an examination report based on the automated image processing.

10. The method of claim 1, wherein the examining comprises using a fluorescence imaging system that comprises:
a light source configured to generate an illumination light beam having a first wavelength;
a digital camera configured to capture fluorescence images; and
optics configured to direct the illumination light beam to a part under examination and further configured to direct a fluorescence light beam generated by the part in response to the illumination light beam to the digital camera, the fluorescence light beam having a second wavelength larger than the first wavelength.

11. The method of claim 10, wherein the fluorescence imaging system further comprises a translation stage configured to controllably move the part relative to the optics.

12. The method of claim 10, wherein the optics comprises an optical filter configured to stop the first wavelength from reaching the digital camera.

13. The method of claim 10,
wherein the first wavelength is in the range between 350 nm and 450 nm; and
wherein the second wavelength is in the range between 450 nm and 650 nm.

14. The method of claim 1, wherein the solution of the fluorescence dye is water-, alcohol-, or acetone-based.

15. The method of claim 1, further comprising temperature cycling the IC assembly prior to the soaking.

16. An automated method of inspecting fracture surfaces produced by physical separation of an integrated-circuit (IC) component from a substrate, the IC component and the substrate having been connected to each other prior to the physical separation by a plurality of solder joints, the method comprising:
cross-referencing a part under examination and a corresponding electronic computer-aided-design file, with the part secured on a translation stage of a fluorescence imaging system, the cross-referencing being performed by an electronic controller, the part being the IC component or the substrate obtained by separating the IC component and the substrate to expose a plurality of first fracture surfaces at the IC component and a corresponding plurality of second fracture surfaces at the substrate, each matching pair of the first and second fracture surfaces corresponding to a respective one of the solder joints; and
acquiring fluorescence images of individual ones of the fracture surfaces by the electronic controller operating the translation stage to sequentially move the individual ones of the fracture surfaces into a field of view of a microscope objective of the fluorescence imaging system and by the electronic controller further operating a digital camera of the fluorescence imaging system to acquire fluorescence images of objects in the field of view.

17. The method of claim 16, further comprising the electronic controller performing automated image processing to quantify an extent of cracks in different ones of the solder joints as revealed by fluorescent-dye indications in the fluorescence images.

18. The method of claim 17, further comprising the electronic controller generating an examination report based on the automated image processing.

19. The method of claim 16, wherein the IC component and the substrate have been soaked in a solution of a fluorescent dye prior to the physical separation.

20. A non-transitory machine-readable medium, having encoded thereon program code, wherein, when the program code is executed by a machine, the machine performs operations comprising an automated method of inspecting fracture surfaces produced by physical separation of an integrated-circuit (IC) component from a substrate, the IC component and the substrate having been connected to each other prior to the physical separation by a plurality of solder joints, the method comprising:

cross-referencing a part under examination and a corresponding electronic computer-aided-design (CAD) file, with the part secured on a translation stage of a fluorescence imaging system, the cross-referencing being performed by an electronic controller, the part being the IC component or the substrate obtained by separating the IC component and the substrate to expose a plurality of first fracture surfaces at the IC component and a corresponding plurality of second fracture surfaces at the substrate, each matching pair of the first and second fracture surfaces corresponding to a respective one of the solder joints; and acquiring fluorescence images of individual ones of the fracture surfaces by the electronic controller operating the translation stage to sequentially move the individual ones of the fracture surfaces into a field of view of a microscope objective of the fluorescence imaging system and by the electronic controller further operating a digital camera of the fluorescence imaging system to acquire fluorescence images of objects in the field of view.

* * * * *